United States Patent

Boerstoel et al.

[11] Patent Number: 5,804,120
[45] Date of Patent: Sep. 8, 1998

[54] PROCESS FOR MAKING CELLULOSE EXTRUDATES

[75] Inventors: Hanneke Boerstoel, Arnhem; Marco Ypma, Duiven, both of Netherlands

[73] Assignee: Akzo Nobel N.V., Arnhem, Netherlands

[21] Appl. No.: 793,760

[22] PCT Filed: Aug. 17, 1995

[86] PCT No.: PCT/EP95/03271

§ 371 Date: Feb. 19, 1997

§ 102(e) Date: Feb. 19, 1997

[87] PCT Pub. No.: WO96/06207

PCT Pub. Date: Feb. 29, 1996

[30] Foreign Application Priority Data

Aug. 19, 1994 [NL] Netherlands ............. 9401351

[51] Int. Cl.$^6$ ................. D01D 5/06; D01F 2/02
[52] U.S. Cl. ............. 264/187; 264/178 F; 264/211.14
[58] Field of Search ............... 264/187, 203, 264/178 F, 211.14

[56] References Cited

U.S. PATENT DOCUMENTS

| | | | |
|---|---|---|---|
| 4,058,411 | 11/1977 | Bellamy et al. | 127/37 |
| 4,839,113 | 6/1989 | Villaine et al. | 264/28 |
| 5,368,385 | 11/1994 | Adamo et al. | 366/139 |
| 5,571,468 | 11/1996 | Meraldi et al. | 264/187 |

FOREIGN PATENT DOCUMENTS

| | | |
|---|---|---|
| 168876 | 1/1986 | European Pat. Off. . |
| 54859 | 2/1943 | Netherlands . |
| 263810 | 7/1926 | United Kingdom . |
| 762959 | 12/1956 | United Kingdom . |
| WO 95/20696 | 8/1995 | WIPO . |
| WO 96/06208 | 2/1996 | WIPO . |

OTHER PUBLICATIONS

K. Kamide et al., "Formation and Properties of the Lyotropic Mesophase of the Cellulose/Mixed Inorganic Acid System", Polymer Journal, vol. 25, No. 5, pp. 453–461 (1993).
Derwent Patent Abstract 88–153465/22 (1988).
Derwent Patent Abstract 88–351892/49 (1988).
Patent Abstracts of Japan, vol. 17, No. 42 (C–1020) (1993).
A.S. Chegolya et al., "Production of Regenerated Cellulose Fibers Without Carbon Disulfide", Textile Research Journal 59, Sep. 1989, No. 9, pp. 501–506.

*Primary Examiner*—Leo B. Tentoni
*Attorney, Agent, or Firm*—Richard P. Fennelly; Louis A. Morris

[57] ABSTRACT

Celluloe extrudates can be made from an optically anisotropic solution containing 94–100 wt % of: cellulose; phosphoric acid and/or its anhydrides; and water by extruding the solution, coagulating the formed extrudates, and then aftertreating those extrudates so that they have a degree of acidity which at least equals 7. Fibres obtained by such a process possess particularly good thermal stability and are suitable for use as a reinforcing material.

4 Claims, No Drawings

PROCESS FOR MAKING CELLULOSE EXTRUDATES

BACKGROUND OF THE INVENTION

The invention pertains to a process for making cellulose extrudates from an optically anisotropic solution containing 94–100 wt. % of the following constituents:

cellulose, phosphoric acid and/or its anhydrides, and water, by extruding the solution and then coagulating the formed extrudates.

Such a process is disclosed in our co-pending patent application based on the Netherlands patent application NL 9401351.

It was found that fibres obtained by extruding and coagulating the solution mentioned in the opening paragraph are particularly susceptible to heat treatment. For instance, it has been found that a heat treatment of 5 minutes at 175° C. can result in the breaking force of the fibres being reduced by about 80% as compared with the original breaking tenacity.

SUMMARY OF THE INVENTION

The susceptibility of the extrudates to a heat treatment can be greatly reduced by the manner of aftertreatment of the extrudates. The invention consists in that in a process of the type mentioned in the opening paragraph the extrudates are aftertreated such that after the aftertreatment the extrudates have a degree of acidity which at least equals 7.

DESCRIPTION OF THE PREFERRED EMBODIMENTS

In the present patent, specification the solvent is made up, by definition, of the added phosphoric acid and/or anhydrides thereof, and all the water present in the solution which is not chemically bonded. For that reason, water derived from the cellulose that is generally added at a later time is always considered to be part of the solvent in this description, as is water from substances which are among "other constituents", which substances may be added at any time during the preparation of the solution.

The term phosphoric acid in this application stands for all inorganic acids of phosphorus, including mixtures thereof. Orthophosphoric acid is an acid of pentavalent phosphorus, i.e., $H_3PO_4$. The anhydrous equivalent thereof, i.e., the anhydride, is also known as phosphorus pentoxide ($P_2O_5$). Depending on the amount of water in the system, there is, in addition to orthophosphoric acid and phosphorus pentoxide, a series of pentavalent phosphoric acids with a water-binding capacity between the pentoxide and the ortho-acid. Alternatively, solvents of, say, orthophosphoric acid with a concentration of orthophosphoric acid of less than 100% may be used.

Due to some reaction between the phosphoric acid and the cellulose, the solution may contain phosphorus derivatives of cellulose. These derivatives of cellulose are also considered to belong to the constituents making up 94–100 wt. % of the solution. Where the percentages by weight of cellulose in solution listed in this patent specification concern phosphorus derivatives of cellulose, they relate to quantities calculated back on the cellulose. The same holds for the amounts of phosphorus mentioned in this specification.

The anisotropic solution

Already at a cellulose concentration of 8% in a solution of phosphoric acid anisotropy was observed, and anisotropic solutions were still obtained at cellulose concentrations of 40% or higher. Such high concentrations preferably are prepared at elevated temperatures. Selecting a cellulose concentration of more than 8% gives a significantly more economical method of making products from the solutions. Thus anisotropic cellulose solutions can be obtained by selecting a cellulose concentration in the range of about 8 to 40%. Optimum processing of these solutions into fibres was found to be attained in the range of 10 to 30%, preferably 12,5 to 25%, more particularly 15 to 23%. Different fields of application of the solutions may have other optimum concentration ranges.

To obtain the solvent system by means of which anisotropic solutions can be attained, the phosphorus content is determined by converting the quantities by weight of phosphoric acid in the solvent into the equivalent quantities by weight of the corresponding anhydride. Converted in this way, orthophosphoric acid is composed of 72,4% of phosphorus pentoxide and residual water, while polyphosphoric acid $H_6P_4O_{13}$ is composed of 84% of phosphorus pentoxide and residual water.

The concentration of $P_2O_5$ in the solvent is calculated by starting from the overall quantity by weight of inorganic acids of phosphorus and their anhydrides, and the overall amount of water in the solvent, converting the acids into water and $P_2O_5$, and calculating which percentage of said overall quantity by weight is made up of $P_2O_5$. If other phosphoric acids are employed, the conversion into the corresponding anhydrides is carried out analogously.

If a phosphorus system contains acids of pentavalent phosphorus, the solvent for preparing the anisotropic solution will contain 65–80 wt. % of phosphorus pentoxide, preferably from 70 to 80 wt. %. In a most preferred embodiment of the present invention, a solvent containing from 71 to 75 wt. % of phosphorus pentoxide is used for preparing anisotropic solutions containing 8 to 15 wt. % of cellulose, and a solvent containing from 72 to 79 wt. % of phosphorus pentoxide is used for preparing anisotropic solutions containing 15 to 40 wt. % of cellulose.

In addition to water, phosphoric acid and/or anhydrides thereof, cellulose, and/or reaction products of phosphoric acid and cellulose other substances may be present in the solution.

For instance, solutions can be prepared by mixing constituents classifiable into four groups: cellulose, water, inorganic acids of phosphorus and their anhydrides, and other constituents. The "other constituents" may be substances which benefit the processability of the cellulose solution, solvents other than phosphoric acid, or additives, e.g., to counter cellulose degradation as fully as possible, or dyes and the like.

The solution according is composed of 94–100 wt. % of cellulose, phosphoric acid and/or anhydrides thereof, and water. Preferably, the solution is composed of 96–100 wt. % of cellulose, phosphoric acid and/or anhydrides thereof, and water.

Preferably, adjuvants or additives are present only in an amount of 0 to 4 wt. %, calculated on the overall quantity by weight of the solution. More favoured still is a solution containing the lowest possible amount of substances other than the constituents cellulose, phosphoric acid and/or anhydrides thereof, and water, i.e., from 0 to 1 wt. % of additives.

Preparation of the anisotropic solution

Russian patent publications SU 1348396 and SU 1397456 provide several examples of the preparation of solutions of cellulose in phosphoric acid. The overall period of time required to obtain a homogeneous solution ranges from 2 to 400 hours. Moreover, it was found that there is a sharp and uncontrolled decrease of the degree of polymerisation during the preparation of the solution.

It is undesirable, when making solutions on an industrial scale, to need long periods to dissolve in view of the then required size of the storage/dissolving tanks. Furthermore, the continuous preparation of such solutions is hindered by long periods needed to dissolve. Also, a sharp, uncontrolled decrease of the cellulose DP can be disadvantageous as regards the further use of the solution, e.g., when the solution is employed to make cellulose fibres. An uncontrolled decrease of the DP during the preparative process will also make it more difficult to prepare a solution of fairly constant quality, more particularly when various types of cellulose are used in the preparation of the solution.

It is clear from the aforementioned patent publications that dissolving cellulose in a solvent primarily containing phosphoric acid will take a long time.

U.S. Pat. No. 5,368,385 discloses that the dissolution in water of polymers which are extremely soluble in water is severely hampered by the formation of a impermeable film on the wetted surface of formed polymer lumps. Without wishing to be bound by any theory, applicant supposes that during the dissolution of cellulose particles in phosphoric acid the outer layer of the cellulose employed dissolves comparatively quickly to form an impermeable layer, analogous to the disclosure of U.S. Pat. No. 5,368,385. It is this impermeable layer which hampers/slows down the further dissolution of the cellulose enclosed by it. Several processes were found which provide an answer to this problem.

One answer can be seen to lie in the very rapid and thorough mixing of cellulose and the phosphoric acid-containing solvent, the mixing action preferably being such as will give particulate cellulose in the solvent before the formation of a too thick impermeable layer around the pieces of cellulose can slow down further dissolution too much. The rate at which the impermeable layer is formed, i.e., the rate at which the cellulose is dissolved in the phosphoric acid-containing solvent, can be decreased by lowering the temperature at which the cellulose is contacted with the solvent. When there is particulate cellulose in the solvent, said particulate cellulose preferably is on a micro scale, e.g., in the form of cellulose fibrils, dissolution of these small pieces in a short time will give a solution containing cellulose and inorganic acids of phosphorus.

Alternatively, an answer can be seen to lie in so processing the cellulose during its mixing with the phosphoric acid-containing solvent that the impermeable outer layer formed on the cellulose is removed therefrom with great regularity.

The mixing of cellulose and the phosphoric acid-containing solvent will proceed more rapidly as the cellulose in the solvent is in smaller pieces. To this end the cellulose may already be rendered particulate, e.g., by being pulverised, prior to being combined with the solvent. Alternatively, the cellulose and the solvent can be combined in such an apparatus as will not only provide intermixing of the cellulose and the solvent but also a reduction in size of the pieces of cellulose present in the mixture.

When preparing a cellulose-containing solution using cellulose and a phosphoric acid-containing solvent, three steps can be distinguished in addition to combining the cellulose and the solvent, viz.:

1 reducing the cellulose in size,
2 mixing the cellulose and the phosphoric acid-containing solvent, and
3 dissolving the cellulose in the solvent.

Given the rate at which cellulose is dissolved in a phosphoric acid-containing solvent, steps 2 and 3 cannot be considered independently. When the cellulose and the solvent are intermixed, the cellulose will also dissolve in the solvent. As has been indicated above, the dissolution of the cellulose can be slowed down by lowering the temperature.

Step 1 can be dissociated from steps 2 and 3. One example of this is the preparation of a solution from powdered cellulose and a phosphoric acid-containing solvent.

As has been indicated above, it is also possible to combine all three steps, i.e., by combining the reduction in size, mixing, and dissolution of the cellulose in a single apparatus equipped such that the cellulose can be reduced in size and mixed in the presence of the solvent.

Especially when cellulose solutions are to be prepared on an economically attractive scale, it is advantageous to combine the aforesaid three steps in a single apparatus, especially if it proves possible to prepare a cellulose solution in such an apparatus in a continuous process, i.e., a preparative process in which starting materials are fed to the apparatus in a more or less constant stream while a cellulose solution is discharged from the apparatus also in a more or less constant stream.

It was found that solutions can be prepared if cellulose and the phosphoric acid-containing solvent are combined in an apparatus in which the shearing forces generated by its mixers and kneaders ensure that there can be intensive mixing of one or more added constituents. In a suitable embodiment the mixing and kneading apparatus used to practice the process according to the invention is a high-shear mixer. Examples of high-shear mixers known to the skilled person include a Linden-Z kneader, an IKA-duplex kneader, a Conterna kneader, or a twin-screw extruder.

A highly suitable embodiment involves making use of an apparatus which also permits particle size reduction. Preferably, the high-shear mixer also permitting particle size reduction is a twin-screw extruder. By proper selection of the mixing, kneader, and milling units and their order on the shafts of a twin-screw extruder many different forms of cellulose, such as sheets, strips, scraps, chips, and powder, can be reduced in size where needed and mixed thoroughly with the phosphoric acid-containing solvent before the dissolution of the cellulose in the solvent is slowed down too much by the formation of a impermeable layer.

After combination of the phosphoric acid-containing solvent and the cellulose in a mixing or kneading apparatus, the cellulose is mixed with the solvent and there is cellulose dissolution. The degree of mixing should be such as will prevent the cellulose dissolution being slowed down too much by the formation of an impermeable layer on the cellulose. The cellulose dissolution can be slowed down by lowering the temperature. One advantageous process involves the cellulose and the solvent being combined in an apparatus, with the temperature in the section of the apparatus where the cellulose and the solvent are combined and mixed being less than 30° C., preferably in the range of 0° to 20° C. In another favourable embodiment the solvent, prior to being combined with the cellulose, is cooled such that its temperature is below 25° C. In that case the solvent can be either in the solid or in the liquid state. It is possible to cool the solvent, prior to being combined with the cellulose, in such a way as to be in the form of small pieces of solid solvent.

According to another advantageous embodiment, first a portion of the solvent is mixed with the cellulose, after which the remaining solvent is added to the formed mixture/solution in one or several steps.

An advantageous process will have the apparatus constructed such that during the mixing and kneading the starting products and the formed solution are conveyed from an opening in the apparatus where the solvent and the cellulose are combined to another opening where the solution leaves the apparatus. Examples of such apparatus include a Conterna kneader, a twin-screw extruder, an Linden-Z kneader, and a Busch co-kneader.

In a favourable embodiment of the process a twin-screw extruder is used as mixing and kneading apparatus with a conveying system. In such an apparatus there may be several different zones for the products in the apparatus to pass through. In the first zone there will be primarily mixing of the supplied cellulose with the solvent and reduction in size. In the next zone the dissolution of cellulose will also play a major part. The subsequent zone will primarily hold the formed solution, which is subjected to further homogenisation and mixed with the as yet undissolved cellulose.

In such an apparatus the dissolution of cellulose and the properties of the formed solution can be affected by the temperature selected for the various zones.

By selecting a temperature for the first zone which is below 30° C., preferably in the range of 0° to 20° C., the dissolution of cellulose can be slowed down. By increasing the temperature, e.g., in a next zone, cellulose dissolution is speeded up. It should be noted in this connection that heat may be generated both during cellulose dissolution and as the solvent and the cellulose are combined.

By selecting the temperature and the residence period in the zone of the mixing and kneading apparatus which primarily contains cellulose in solution, the cellulose solution DP can be controlled. Generally speaking, it holds that the higher the temperature and the longer the residence period at this temperature are, the greater the decrease of the cellulose DP will be. In addition, the DP of the starting material may have an effect on the decreasing DP for a particular temperature and residence period.

Since the heat exchange between the products in the apparatus and the apparatus itself will not be ideal as a rule, there may be temperature variations between the products in the apparatus and the apparatus itself.

The apparatus can further have a zone in which the formed solution is de-aerated, e.g., by passing the solution through a reduced pressure zone. Also in this zone or in a separate zone water or other constituents may be extracted from or added to the formed solution.

To remove any remaining small undissolved particles from the solution, it may be filtered either in the apparatus or on leaving it. The resulting solution is high-viscous. It can be used immediately, but also stored for some time at low temperature, e.g., between −20° and 10° C. Generally speaking, the longer it is desired to store the solution, the lower the temperature selected should be.

It should be noted that the obtained solution may become solid, e.g., through crystallisation, if it is stored for some time at a lower temperature. Heating the formed solid mass will again give a high-viscous solution.

The above process makes it possible to prepare cellulose solutions in a short period of time and with a controlled decrease of the cellulose DP. For instance, it was found that within 15 minutes or even less a cellulose solution could be made from powdered cellulose and a solvent containing phosphoric acid. This time period can be further reduced by selecting a higher temperature for forming the solution.

The solution according to the invention can be prepared using all available types of cellulose, such as Arbocell BER 600/30, Arbocell L 600/30, Buckeye V5, Buckeye V60, Buckeye V65, Viscokraft, hemp, flax, ramie and Eucaliptus cellulose, all of which types are known to the skilled person. Cellulose can be added in a wide range of forms, e.g., in sheets, strips, scraps, chips, or as a powder. The form in which the cellulose can be added is restricted by its introduction into the mixing and kneading apparatus. If the cellulose employed is in a form which cannot be charged to the apparatus, it should be reduced in size outside the apparatus in a known manner, e.g., with a hammer mill or a shredder. The cellulose to be used preferably has an $\alpha$-content of more than 90%, more particularly of more than 95%. For spinning good fibres from the solutions it is recommended to employ so-called dissolving pulp with a high $\alpha$-content, e.g., such as is generally used in the manufacture of fibres for industrial and textile applications. Examples of suitable types of cellulose include Arcobell BER 600/30, Buckeye V60, Buckeye V65, and Viscokraft. The cellulose DP as determined by the procedure to be indicated hereinafter in this patent specification advantageously is in the range of 250 to 1500, more particularly in the range of 350 to 1350. The DP of the cellulose in the solution preferably is in the range of 215 to 1300, more particularly in the range of 325 to 1200.

Cellulose as it is commercially available generally contains some water and may be used as such without any objection. Of course, it is also possible to use dried cellulose, but this is not essential.

If use is made of a mixture of different inorganic phosphoric acids to obtain a solvent having the desired quantity of acid converted into anhydride, the acids after being mixed preferably are heated to a temperature in the range of 30° to 80° C. and the solvent is kept heated for ½–12 hours. In some cases, depending on the acids used, other times and/or temperatures may be desired. For instance, a very homogeneous solution without surface irregularities can be obtained by employing a solvent made by melting down orthophosphoric acid at a temperature in the range of about 40° to 60° C., adding the desired quantity of polyphosphoric acid, mixing the two, and cooling the mixture to about 20° C.

According to a suitable method, the solvent is left to stand for some time, e.g., between 30 minutes and several hours, before being combined with cellulose.

The other constituents can be added to the solvent prior to its combination with the cellulose. Alternatively, the other constituents can be added to the cellulose prior to its combination with the solvent. Also, the other constituents can be added as the solvent is combined with the cellulose. In addition, of course, the other constituents can be added after the solvent and the cellulose have been combined.

Time, the temperature at which the solution is stored, and the acid concentration were all found to have a major effect on the content of phosphorus bound to cellulose in the solution.

Phosphorus is assumed to be bound to cellulose if, after a thorough washing treatment and, optionally, a neutralisation treatment, a coagulated solution is still found to contain phosphorus.

It was found that a solution according to the present invention containing 18 wt. % of cellulose, which was obtained by dissolving cellulose in a solvent containing 80 wt. % of orthophosphoric acid and 20 wt. % of polyphosphoric acid, will contain approximately 0.25 wt. % of bound phosphorus after storage for 1 hour at 30° C. However, if such a solution is stored at 50° C., it will contain approximately 0.8 wt. % of bound phosphorus after 1 hour.

It was found that a solution according to the invention will at any rate contain at least 0.02% of phosphorus bound to cellulose.

It was found that by adding a small quantity of water to the solvent just prior to the addition of the cellulose, simultaneously with the addition of cellulose, or just after the addition of cellulose, a solution with a low content of phosphorus bound to cellulose can be obtained.

The obtained solution can be used to various ends. For instance, the solution can be used in making fibres, both for industrial and textile applications, hollow fibres, membranes, nonwovens, films, and for other well-known applications for cellulose-containing solutions. In addition, the solution can be employed to prepare cellulose derivatives.

Spinning the anisotropic solution

The obtained solution can be spun or extruded through a spinneret having the desired number of orifices, or moulded to form a film. Spinning solutions with a cellulose concentration of from 15 to 25 wt. % preferably are extruded at a temperature between 0° and 75° C., the residence times for the higher temperatures being as brief as possible. Preferably, such solutions are extruded at a temperature between 20° and 70° C., more particularly between 40° and 65° C. For other concentrations it holds that as the concentration is higher, so the spinning temperature preferably will also be higher than the ranges indicated here to compensate, int. al., for the higher viscosity of the solution, and vice versa. However, it should be noted that a higher spinning temperature may lead to a higher content of phosphorus bound to cellulose.

The desired number of orifices in the spinneret plate is dependent on the future use of the fibres to be obtained. Thus, a single spinneret may be used not only for extruding monofilaments but also for extruding the multifilament yarns much in demand in actual practice which contain from 30 to 10 000, preferably from 100 to 2000, filaments. The manufacture of such multifilament yarns preferably is carried out on a cluster spinning assembly containing a number of spinning orifice clusters as described in EP 168 876, or using a spinneret as described in W0 95/20696.

Following extrusion, the extrudates are passed through an air gap the length of which is selected depending upon the process conditions, e.g., the spinning temperature and the cellulose concentration) and the desired degree of drawing of the extrudates. In general, the air gap will have a length in the range of 4 to 200 mm, preferably in the range of 10 to 100 mm. Next, the obtained extrudates are passed through a coagulation bath in a manner known in itself. As suitable coagulants may be selected low boiling, organic liquids which do not have a swelling effect on cellulose, water, or mixtures thereof. Examples of such suitable coagulants include alcohols, ketones, esters, and water, or mixtures thereof. Preference is given to the use of isopropanol, n-propanol, acetone or butanone as coagulants, since they display very good coagulating action and in most cases have good properties when it comes to safety and ease of handling. For this reason mixtures of water and these coagulants also are very serviceable.

The coagulation bath preferably has a temperature in the range of −40° C. (providing the coagulant selected allows this) to 30° C., with very favourable results being obtained at coagulation bath temperatures below 20° C.

After coagulation there may be washing out, in combination or not with a neutralising treatment. The washing out may take the form of placing a spool of coagulated yarn in a vessel containing the washing agent, or else by passing the fibres through a bath containing the appropriate liquid in a continuous process and then winding them onto a roller. According to a process highly suited for use in actual practice, washing out is performed with so-called jet washers, such as described in British patent specification GB 762,959. Low boiling, organic liquids which do not have a swelling effect on cellulose, e.g., alcohols, ketones, and esters, water, or mixtures thereof can be employed as washing agent. Preference is given to the use of isopropanol, n-propanol, butanone, water, or mixtures thereof as washing agent. Highly suitable to be used are water, or mixtures of water and the coagulation agent. Washing out may be performed at any temperature below the boiling temperature of the washing agent, at any rate preferably below 100° C.

It was found that when a solution according to the invention is stored for a longer period of time or at elevated temperature, it cannot be spun into fibres by an air gap spinning process if the solution is coagulated in a water bath or if, after coagulation, the fibres are washed with water, since the fibres will swell to a great extent when contacted with water.

It was also found that if the quantity of water absorbed by a fibre during coagulation in a water bath or when the fibre is washed out in a water bath is higher than 560% in relation to the dry weight of the fibre, then the individual fibres in the bundle can no longer be distinguished. A water absorption higher than 1300% will give gel formation. To make fibres having favourable mechanical properties, it is preferred to have a fibre moisture absorption of less than 570%. It was found that a lower content of phosphorus bound to cellulose will also give a lower moisture absorption.

It was found that if the solution according to the invention contains less than 3 wt. % of bound phosphorus and the solution is coagulated in a bath which contains less than 10 wt. % of water, e.g., an acetone coagulation bath, and the fibre is washed out in a water bath, the individual fibres in the bundle a clearly distinguishable still. It was further found that if the solution contains less than 1.3 wt. % of bound phosphorus and the solution is coagulated in water, the individual fibres in the bundle are clearly distinguishable still during water washing.

When making fibres of favourable mechanical properties, the solution preferably contains less than 0.8 wt. %, more particularly less than 0.5 wt. %, of bound phosphorus.

Neutralisation can be carried out either immediately following the washing step, or in between the coagulation and washing steps. Alternatively, the neutralisation step can take place after the washing step and be followed by a next washing step. Another option is to dry the yarn after coagulation and washing, before the neutralisation step is carried out. In an economically advantageous process neurtalisation is carried out after the washing of the yarn. It has been found that fibres obtained in the aforesaid manner and washed and neutralised such that their degree of acidity is less than 7 will exhibit a reduction in breaking force during a 5-minute heat treatment at 175° C., said reduction being more marked as the fibres' degree of acidity is lower. If the degree of acidity of the fibres at least equals 7, there is no, or hardly any, reduction of the breaking force during the aforementioned heat treatment.

It was found that solutions in water of $Na_2CO_3$, $NaHCO_3$ or NaOH are highly suitable for use as neutralisers in obtaining extrudates having a degree of acidity greater than or equal to 7, more particularly greater than or equal to 8. The lowest susceptibility of the extrudates to a heat treatment was found for a degree of acidity greater than or equal to 9. The extrudates can be neutralised using a batch-wise process, such as immersion in such a solution, or a continuous process, e.g., passing through a bath containing such a solution, or by applying such a solution to the extrudates by spraying or with a kiss roll, e.g., with the aid of jet washers, washing plates, or a stick applicator.

The solution according to the present invention is especially advantageous because its preparation and spinning can be carried out as a continuous process on a single line. In addition, the solution has the advantage that when products are made therefrom, in particular when no constituents other than phosphoric acid, water, and cellulose are employed, the cellulose and the phosphoric acid react hardly, and hence there is no, or hardly any, need for cellulose regeneration.

Thus are obtained in a highly advantageous manner cellulose fibres especially suited to be used in rubber articles subjected to mechanical load, such as vehicle tyres, conveyor belts, rubber hose, and the like. The fibres are particularly suited to be used as a reinforcement in vehicle tyres, e.g., car and truck tyres.

Fibres obtained by spinning the solution according to the invention were found to have a good resistance to dynamic compression load. It was found that this resistance increases with the decreasing content of phosphorus bound to cellulose in the solution. This resistance can be measured, e.g., by employing a so-called GBF (Goodrich Block Fatigue) test.

Generally speaking, the now found fibres constitute a favourable alternative to industrial yarns such as nylon, rayon, polyester, and aramid.

Further, the fibres can be pulped. Such pulp, which may be mixed with other materials, such as carbon pulp, glass pulp, aramid pulp, polyacrylonitrile pulp, or not, is highly suited to be used as a reinforcing material, e.g., in asphalt, cement and/or friction materials.

Properties of fibers obtained by spinning the anisotropic solution.

The resulting cellulose fibres have very good mechanical properties such as strength, modulus, and favourable elongation. Since it is found that the solvent reacts with the cellulose hardly, the properties obtained from the cellulose structure, such as the chain modulus, are retained, while the anisotropy of the solution makes it possible to attain properties desired in many mechanical applications.

The properties of the fibres make them particularly suited for use in technical applications.

Using the solution according to the present inventions, fibres can be prepared having far better properties than the cellulose fibres known in the art used in technical applications, e.g., Cordenka 660® and Cordenka 700®, which are prepared using the so-called viscose process.

Using the solution according to the present invention cellulose yarns can be made which have a breaking tenacity higher than 700 mN/tex, more in particular higher than 850 mN/tex, a maximum modulus at an elongation of less than 2% of at least 14 N/tex, and an elongation at break of at least 4%, more in particular higher than 6%.

Due to the nature of the spinning solution and the coagulant, the fibres contain from 0,02 to 1,3 wt. % of phosphorus bound to the cellulose if the fibres are coagulated in water or from 0,02 to 3,0 wt. % of phosphorus bound to the cellulose if the fibres are coagulated in a coagulant which does not contain water and washed with water. Preferably the fibres contain from 0,02 to 0,5 wt. % of phosphorus bound to the cellulose.

In WO 85/05115 celluloseformate multifilament yarns spun from anisotropic phosphoric acid containing solutions are reported. The yarns show a morphology which appears to be built up of layers embedded in each other, which surround the axis of the filaments, and which besides varies pseudoperiodically along the axis of the filaments. In WO 94/17136 it is suggested that the morphology is connected with the anisotropic solution from which the filaments are obtained.

Although the yarns according to the present invention are obtained from an anisotropic solution which contains phosphoric acid, the yarns do not show a morphology as described in WO 85/05115.

Measuring methods

Determination of isotropy/anisotropy in the solution

Visual determination of the isotropy or anisotropy was performed with the aid of a polarisation microscope (Leitz Orthoplan-Pol (100x)). To this end about 100 mg of the solution to be defined were arranged between two slides and placed on a Mettler FP 82 hot-stage plate, after which the heating was switched on and the specimen heated at a rate of about 5° C./min. In the transition from anisotropic to isotropic, i.e., from coloured (birefringent) to black, the temperature is read off at virtual black. This temperature is called the transition temperature, $T_{ni}$. The visual assessment during the phase transition was compared with an intensity measurement using a photosensitive cell mounted on the microscope. For this intensity measurement a specimen of 10–30 $\mu$m was arranged on a slide such that no colours were visible any longer when crossed polarisers were employed. Heating was carried out as described above. The photosensitive cell, connected to a recorder, was used to write the intensity as a function of time. Above a certain temperature (differing for the different solutions) there was a linear decrease of the intensity. Extrapolation of this line to an intensity of 0 gave the $T_{ni}$. In all cases, the value found proved a good match for the value found by the abovementioned method.

Solutions are considered to be anisotropic if birefringence is observed in a condition of rest. Generally speaking, this holds for measurements carried out at room temperature. However, solutions according to the present invention which can be processed—e.g., by being spun into fibres—at a temperature below room temperature and display anisotropy at said low temperature are considered anisotropic also.

Determination of degree of acidity

The degree of acidity of the extrudates is determined by introducing 1 g of the coagulated, washed, and, optionally, neutralised, finished, and/or dryed extrudate into 100 ml of demineralised and de-ionised water (milli-Q water, pH=6). The pH of the water containing the extrudate is then determined with a calibrated pH gauge. The degree of acidity of the extrudate equals the pH found for the water containing the extrudate.

Determination of phosphorus content

The content of phosphorus bound to cellulose in the solution, or in a cellulose product made from that solution, can be determined by combining in a decomposition flask (a) 300 mg of cellulose solution which has been coagulated, dried in vacuo for 16 hours at 50° C. after thorough washing out using water, and then stored in a sealed sample vessel with (b) 5 ml of concentrated sulphuric acid and 0,5 ml of an Yttrium solution containing 1000 mg/l of Yttrium. The cellulose is carbonised with heating. After carbonisation, hydrogen peroxide is added to the mixture in portions of 2 ml, until a clear solution is obtained. After cooling the solution is replenished with water to a volume of 50 ml. With the aid of a phosphorus calibration line determined using reference samples containing 100, 40, 20, and 0 mg/l of phosphorus, respectively, ICP-ES (Inductive Coupled Plasma—Emission Spectrometry) is used to determine the phosphorus content in the solution to be measured by means of the following equation:

$$\text{phosphorus content } (\%) = (P_{conc}(mg/l)*50)/(C_w(mg)*10)$$

wherein:

$P_{conc}$=the phosphorus concentration in the solution to be measured and $C_w$=the weighed out quantity of coagulated and washed cellulose.

Yttrium is added as an internal standard to correct the solutions' differing viscosities. The phosphorus content is measured at a wavelength of 213.6 nm, the internal standard is measured at a wavelength of 224.6 nm.

Determination of water content

The quantity of water absorbed by a fibre during coagulation in a water bath or when the fibre is washed out with water can be determined by washing the fibre with water and then removing the adhering moisture through filtering off with a buchner funnel. The moisture content (in wt. % vis-à-vis the dried fibre) can be determined by measuring the decrease in weight as a result of heating for 20 minutes at 160° C.

Mechanical properties

The mechanical properties of the filaments and the yarns were determined in accordance with ASTM standard D2256-90, using the following settings.

The filament properties were measured on filaments clamped with Arnitel® gripping surfaces of 10*10 mm. The filaments were conditioned for 16 hours at 20° C. and 65% relative humidity. The length between grips was 100 mm, the filaments were elongated at a constant elongation of 10 mm/min.

The yarn properties were determined on yarns clamped with Instron 4C clamps. The yarns were conditioned for 16 hours at 20° C. and 65% relative humidity. The length between clamps was 500 mm, the yarns were elongated at a constant elongation of 50 mm/min. The yarns were twisted, the number of twists per meter being 4000/√linear density [dtex].

The linear density of the filaments, expressed in dtex, was calculated on the basis of the functional resonant frequency (ASTM D 1577-66, Part 25, 1968); the yarn's linear density was determined by weighing. The breaking tenacity, elongation, and initial modulus were derived from the load-elongation curve and the measured filament or yarn linear density.

The initial modulus (In. Mod.) was defined as the maximum modulus at an elongation of less than 2%.

The invention will be elucidated with reference to examples.

EXAMPLE A

In a Linden-Z kneader with extruder discharge 13,300 g of orthophosphoric acid (98.8% $H_3PO_4$) were melted and kneaded at 30°–46° C. until a clear, viscous liquid was obtained. To this liquid were added 3,350 g of polyphosphoric acid. After 90 minutes of homogenising at 48° C. the mixture was cooled to 18° C., and 3,600 g of powdered cellulose were added. The mixture was kneaded for 45 minutes (the last 25 of these in vacuo) until a homogeneous solution was obtained. This solution was spun out at 60° C. through a spinneret with 375 capillaries each of a diameter of 65 μm, via an air gap of 40 mm, to a coagulation bath filled with acetone at a temperature of −12° C. The draw ratio in the air gap was about 7. Next, the yarn was washed with water having a temperature of 23° C. In this way one sample was made which was only dried (A-I) and then wound. The other samples were not dried but washed again and neutralised with solutions such as listed in Table I. $CaCO_3$, NaOH, and $Na_2CO_3 \cdot 10\ H_2O$ were used to make these solutions. After the neutralisation treatment the yarn was washed with water again.

The yarn samples obtained in this manner had their breaking force determined both before and after a 5-minute heat treatment in air at a temperature of 175° C. The strength efficiency of the yarns can be determined using the following equation:

$$BT_{eff} = (BT_a / BT_b) * 100$$

wherein $BT_{eff}$ stands for the strength efficiency, $BT_a$ is the breaking force after the heat treatment, and $BT_b$ represents the breaking force before the heat treatment. Also, the degree of acidity of the yarn samples before the heat treatment was measured in the manner disclosed elsewhere in this patent specification.

The results are listed in Table I.

EXAMPLE B

In a Linden-Z kneader with extruder discharge 13,480 g of orthophosphoric acid (99.5% $H_3PO_4$) were melted and kneaded at 30°–40° C. until a clear, viscous liquid was obtained. To this liquid were added 3,240 g of polyphosphoric acid. After 90 minutes of homogenising at 40° C. the mixture was cooled to 12° C., and 3,600 g of powdered cellulose were added. The mixture was kneaded for 90 minutes (the last 70 of these in vacuo) until a homogeneous solution was obtained. This solution was spun out at 59° C. through a spinneret with 375 capillaries each of a diameter of 65 μm, via an air gap of 40 mm, into a coagulation bath filled with acetone at a temperature of +10° C. The draw ratio in the air gap was about 7. Next, the yarn was washed with water of 23° C. and neutralised with solutions such as listed in Table I. $NaHCO_3$, NaOH, and $Na_2CO_3 \cdot 10\ H_2O$ were used to make these solutions. After the neutralisation treatment the yarn was washed with water again.

The strength efficiency and the degree of acidity of the yarn samples were measured as described in Example A.

The results are listed in Table I.

EXAMPLE C

In the same way as described in example B, a 16 wt. % cellulose solution was prepared in a Linden-Z kneader. This solution was spun out at 59° C. through a spinneret with 375 capillaries each of a diameter of 65 μm, via an air gap. The yarn was washed with softened water and without additional drying wound onto a bobbin and stored in a plastic bag for 16 days.

Next the yarns were neutralised with the solutions as listed in Table I. $Na_2CO_3 \cdot 10\ H_2O$, KOH, $K_2CO_3$, LiOH, and $Ba(OH)_2$ were used to make these solutions. After the neutralisation treatment the yarn was washed with water again.

The strength efficiency and the degree of acidity of the yarn samples were measured as described in Example A.

The results are listed in Table I.

TABLE I

| Example | Temperature wash. water [°C.] | Neutralisation treatment | Degree of acidity | Strength efficiency |
|---|---|---|---|---|
| A-I[1] | none | none | 4.2 | 38.7 |
| A-II[1] | 40 | none | 6.2 | 39.8 |
| A-III[1] | 62 | 2.5 wt. % $CaCO_3$ | 6.7 | 61.6 |
| A-IV | 21 | 0.5 wt. % NaOH | 7.4 | 88.7 |
| A-V | 41 | 0.5 wt. % NaOH | 7.8 | 94.7 |
| A-VI | 66 | 2.5 wt. % $Na_2CO_3$[2] | 9.2 | 93.1 |
| A-VII | 21 | 2.5 wt. % $Na_2CO_3$[2] | 9.7 | 93.9 |
| B-I[1] | none | none | 4.3 | 33.1 |
| B-II[1] | 70 | none | 5.5 | 55.9 |
| B-III | 70 | 2.5 wt. % $NaHCO_3$ | 7.8 | 97.7 |
| B-IV | 70 | 5.0 wt. % $Na_2CO_3$[2] | 9.7 | 100.0 |
| B-V | 70 | 2.5 wt. % NaOH | 9.7 | 97.7 |
| C-I | — | 2.5 wt. % $Na_2CO_3$[2] | 9.9 | 101.4 |
| C-II | — | 2.6 wt. % KOH | 10.0 | 98.7 |
| C-III | — | 3.3 wt. % $K_2CO_3$ | 9.9 | 96.3 |
| C-IV | — | 2.0 wt. % LiOH | 9.9 | 98.7 |
| C-V | — | 7,4 wt. % $Ba(OH)_2$ | 9.1 | 100.4 |

[1]Comparative example
[2]Percentage by weight based on $Na_2CO_3 \cdot 10H_2O$

We claim:

1. A process for making cellulose extrudates from an optically anisotropic solution comprising 94–100 wt. % of the following constituents:

cellulose, phosphoric acid and/or its anhydrides, and water, by extruding the solution to form extrudates and then coagulating the formed extrudates, characterised in that the extrudates are aftertreated such that after the aftertreatment the extrudates have a degree of acidity which at least equals 7.

2. A process according to claim 1, characterised in that the degree of acidity of the extrudates after the aftertreatment at least equals 8.

3. A process according to claim 2, characterised in that the degree of acidity of the extrudates after the aftertreatment at least equals 9.

4. A process according to any one of claims 1–3, characterised in that the extrudates are fibres.

* * * * *